United States Patent [19]

De Francisci

[11] 4,121,301

[45] Oct. 17, 1978

[54] CONTINUOUS-FEED ALIMENTARY PASTE MIXER AND IMPROVED NOODLE-MAKING MACHINE

[75] Inventor: Leonard De Francisci, New York, N.Y.

[73] Assignee: De Francisci Machine Corporation, Brooklyn, N.Y.

[21] Appl. No.: 803,679

[22] Filed: Jun. 6, 1977

[51] Int. Cl.² ............................................. A47J 37/00
[52] U.S. Cl. ......................................... 99/353; 99/348; 99/355; 366/134; 366/160
[58] Field of Search ................ 99/483, 485, 538, 567, 99/575, 353, 355, 349, 443 C, 352; 259/154, 148, 178 R, 164, 165, 161, 162, 163

[56] References Cited
U.S. PATENT DOCUMENTS

| | | | |
|---|---|---|---|
| 3,256,181 | 6/1966 | Zingg | 259/154 |
| 3,591,147 | 7/1971 | Anderson | 259/154 |
| 3,719,214 | 3/1973 | Erndt | 259/154 |
| 3,773,520 | 11/1973 | Longenecker | 99/353 |
| 3,937,848 | 2/1976 | Campbell | 99/353 |
| 3,985,070 | 10/1976 | Longenecker | 99/353 |

*Primary Examiner*—Robert W. Jenkins
*Attorney, Agent, or Firm*—Darby & Darby

[57] ABSTRACT

A mixer for continuously providing alimentary paste includes a constant rate fluid feeder responsive to a paste sensor, a constant rate flour feeder also responsive to the sensor and a mixing chamber for receiving flour and fluids from the feeders and for mixing the components into a paste. The mixing chamber includes an exit port through which the mixed paste flows. A paste sensor is positioned in the flow path of exiting alimentary paste, and activates the fluid and flour feeders upon detecting an absence of alimentary paste.

A machine for making Japanese-type noodles incorporates a continuous-feed paste mixer.

8 Claims, 6 Drawing Figures

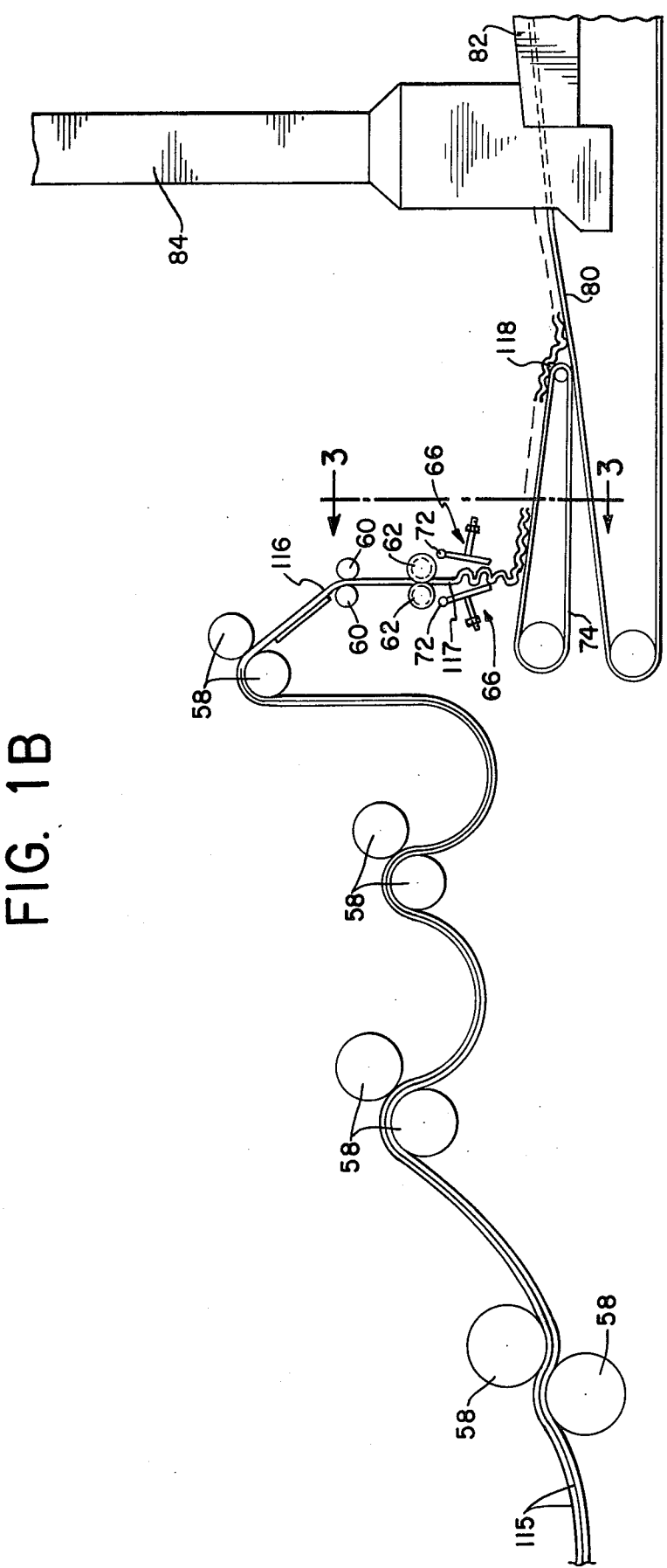

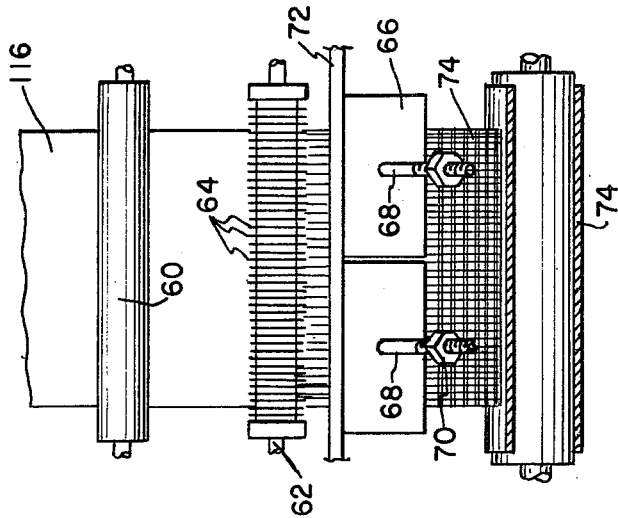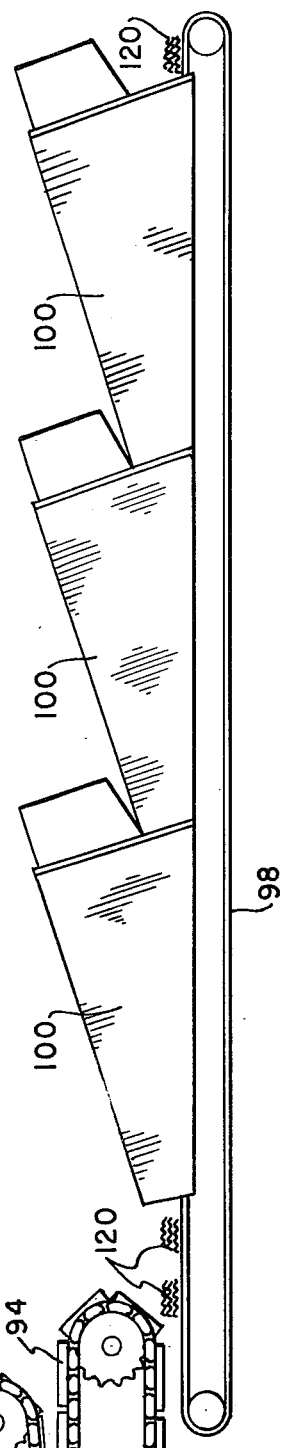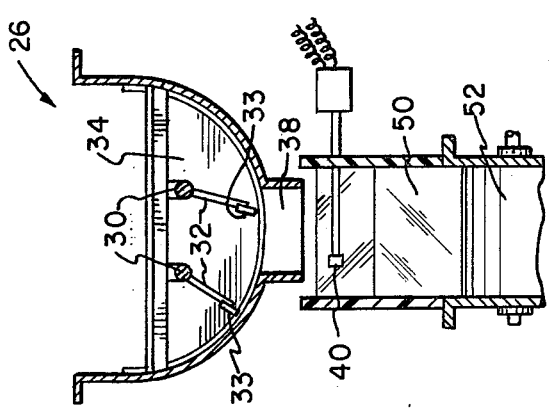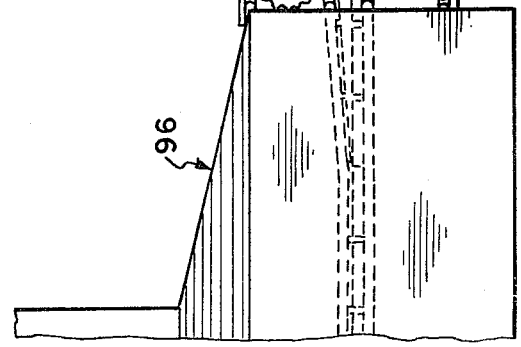

CONTINUOUS-FEED ALIMENTARY PASTE MIXER AND IMPROVED NOODLE-MAKING MACHINE

BACKGROUND OF THE INVENTION

This invention generally relates to apparatus for producing alimentary paste which is composed primarily of a mixture of flour and water.

Traditionally, alimentary paste has been made by depositing predetermined quantities of semolina, water, and occasionally eggs into a large vat. This batch is mixed in the vat generally with large paddles until a homogeneous mixture obtains. The batch is then used in traditional types of machinery for forming macaroni, lasagna, spaghetti, or vermicelli.

Because the proportions of each component of the alimentary paste must fall within certain tolerances, the quantities of each component added to the vat for mixing must be regulated. The so-called "batch" method allows close regulation of the proportions of the paste components, but requires manual operation or supervision to a large degree. Further, use of the batch method limits the utility of the machinery which processes the paste into various products because the machinery is not in use while each new batch of alimentary paste is being prepared.

Accordingly, it is an object of the present invention to develop a mixing device capable of continuous operation for use with machinery to process the paste into food products.

SUMMARY OF THE INVENTION

This object is achieved by providing a mixing vat having a mixing chamber and mixing means such as a plurality of paddles mounted to a rotatable shaft within the chamber. A bulkhead extends upwardly from the base of the mixing chamber to partially divide the mixing chamber into a mixing compartment and an exit compartment. An exit port for the mixed alimentary paste is included in the exit compartment. A paste sensor probe disposed proximate the exit port and in the flow path of exiting alimentary paste determines the presence or absence of paste. Upon sensing an absence of paste, the paste sensor probe activates both a fluid feeder and a flour feeder, each communicating with the mixing chamber. The feeders deliver the necessary components for making alimentary paste at a constant and predetermined rate of flow. After being mixed in the mixing chamber, the paste flows through the exit port and is detected by the paste sensor, which thereupon deactivates the fluid and flour feeders.

The exiting alimentary paste may then be processed into any of a variety of products by machinery heretofore known to those skilled in the art. In the embodiment described, the paste mixer is used with machinery previously made in Japan to process the alimentary paste into oriental-type noodles, commonly called "ramen."

BRIEF DESCRIPTION OF THE DRAWINGS

In the description of a preferred embodiment of the present invention, reference is made to the appended drawings in which:

FIGS. 1a through 1d are diagrammatic illustrations of a preferred embodiment of the continuous feed mixer shown in use with a paste processor for making ramen;

FIG. 2 is a sectional view taken along the line 2—2 of FIG. 1a, showing the mixer and sensor probe; and FIG. 3 is a sectional view of a slicer taken along the line 3—3 of FIG. 1b for slicing sheets of alimentary paste into sinuous noodles.

DESCRIPTION OF A PREFERRED EMBODIMENT

Figure 1A:
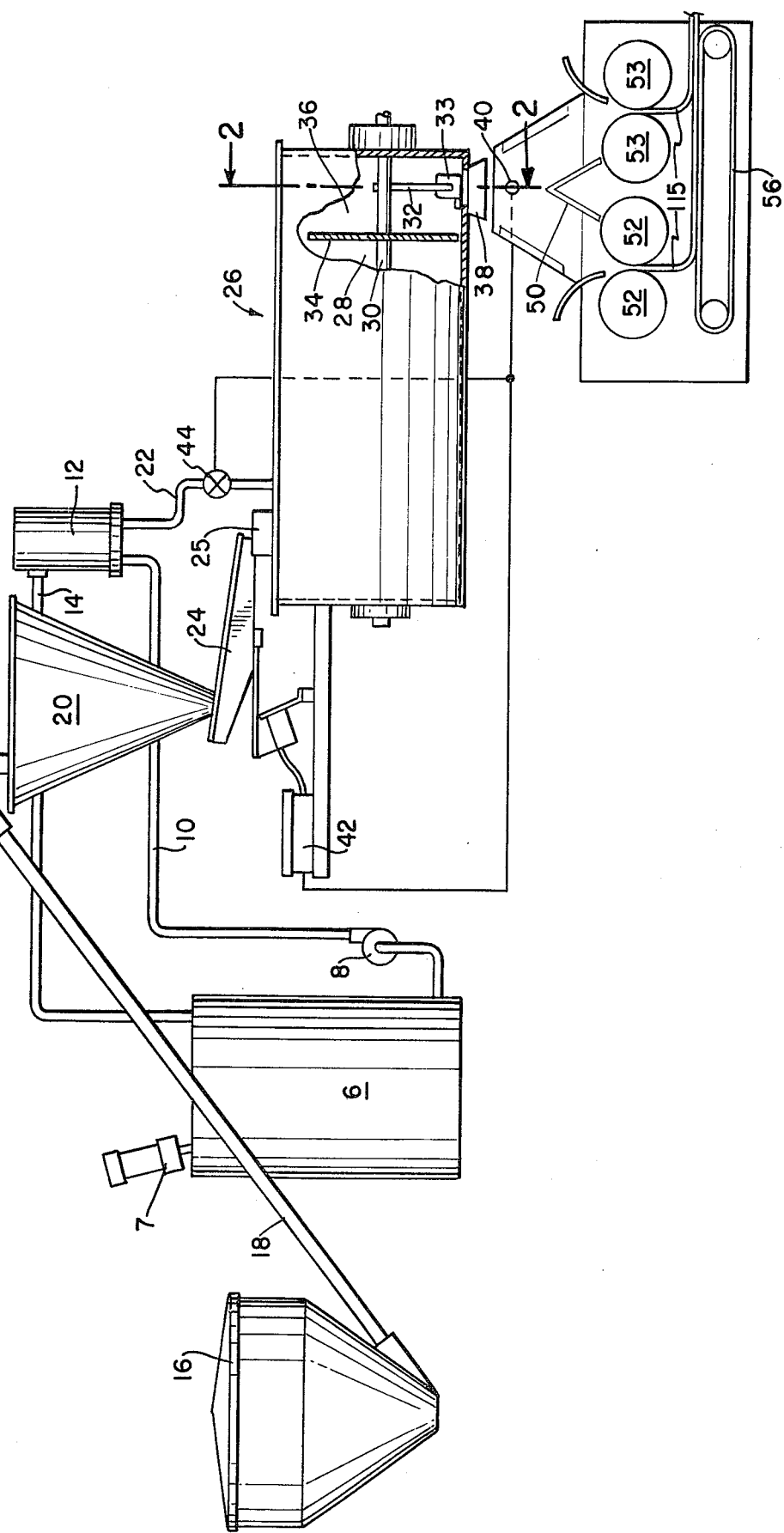
Figure 1C:
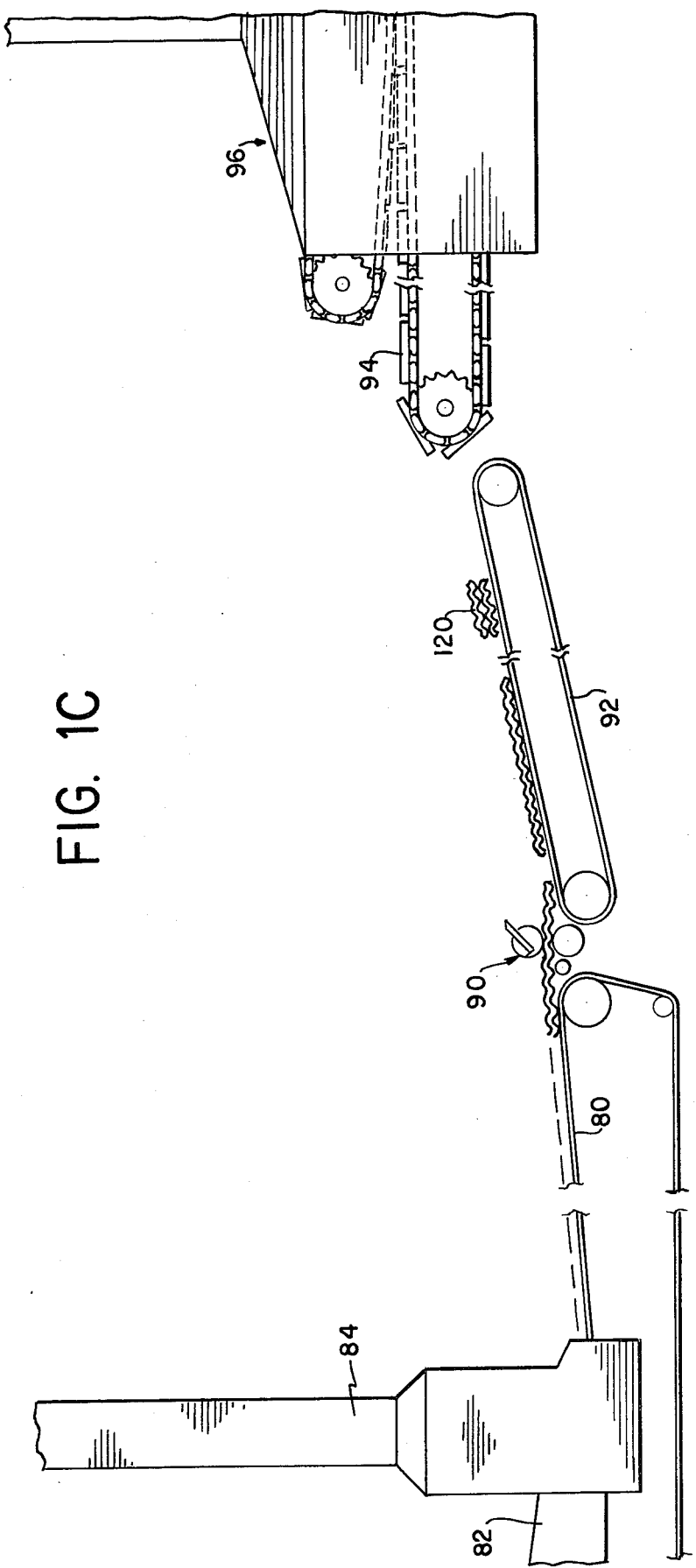

A continuous feed alimentary paste mixer 4 can be utilized to form an improved food processor capable of continuous operation. Briefly, water, flavorings, and preservatives are mixed with flour in a mixer to form alimentary paste. The paste is transformed into a continuous sheet which is thinned and cut into strands. A curl is formed in the strands, after which the strands are steamed, cut into lengths, folded into bricks, dried, and cooled, whereupon they are ready for packaging.

Referring now to the figures, the mixer 4 includes a fluid chamber 6 for containing a supply of water and any water-soluble or miscible additives for the alimentary paste. The chamber 6 may illustratively comprise a large open-top cylindrical vat. If solid soluble additives are to be mixed with the water in the chamber 6, it may be desirable to use a mixing blade (not shown) disposed inside the chamber 6 and rotated by a motor 7. Fluid may be withdrawn from the base of the chamber 6 and deposited in a fluid chamber 12 by a fluid line 10 which communicates with each chamber 6 and 12. To assure that the chamber 12 is constantly filled, a pump 8 may be inserted at any desired point along the fluid line 10. Overflow from the chamber 12 is withdrawn by an overflow line 14 communicating with the top of the chamber 12 and the chamber 6. This arrangement causes the fluid in the chamber 12 to remain at a constant level so that fluid exiting the chamber 12 through fluid line 22, which communicates with the mixing chamber 28 of mixing vat 26, is subjected to a constant hydraulic pressure.

A chamber 16 holds flour and communicates with chamber 20 by virtue of a conveyor 18. The conveyor 18 may illustratively be a screw-type conveyor or a suction hose which removes flour from the chamber 16 and deposits it at the top of the chamber 20. The chamber 20 is disposed superjacent the mixing vat 26, so that flour may fall freely through the chamber 20 to a conveyor 24. The conveyor 24 delivers flour to an intake 25 of the mixing vat 26. The conveyor 24 is shown as a vibrating trough or sluice disposed at an incline to deliver flour to the mixing vat intake 25, which may be subjacent the bottom of the conical chamber 20. Thus, as the flour conveyor 24 vibrates, the flour becomes fluidized and flows down the incline of the conveyor 24 into the mixing vat 26 through the intake 25. It will be understood, however, that other arrangements may be utilized. For instance, the conveyor 24 may constitute an endless belt moving between two distal rollers.

The mixing vat 26 receives flour through intake 25 and fluids through the fluid line 22. These ingredients enter a mixing chamber 28. To mix the ingredients to a uniform consistency, one or more rotatable shafts 30 driven by a motor (not shown) may be disposed within the mixing chamber 28. A plurality of paddles 32 may be radially mounted along the shaft or shafts 30. The paddles may each include a flat in a plane at a non-normal angle to the shaft to assist the mixing of the ingredients into an alimentary paste of the proper homogeneity.

A bulkhead 34 extends vertically upwardly from the base of the mixing chamber 28 to partially divide the mixing chamber into a mixing compartment 35 and an exit compartment 36 communicating with the mixing compartment of the chamber 28. The bulkhead 34 may include an aperture and bearing for the shaft 30 to extend through the bulkhead. As the level of paste within the mixing chamber 28 rises, some paste ultimately passes over the top of the bulkhead 34 into the exit compartment 36 from which the paste eventually exits through port 38. Preferably the shaft 30 extends through the bulkhead and through the exit compartment, so that a paddle 32 may be mounted to the portion of the shaft in the exit compartment 36 to pass directly over and proximate the exit port 38. To prevent the exit port 38 from clogging with alimentary paste, it is preferred that the paddle have a flat in a plane parallel to the shaft 30. Further, the flat on the paddle 32 disposed in the exit compartment 36 may include a protuberance 33 to partially enter and sweep the exit port 38 as the paddle rotates. This arrangement prevents clogging of the exit port 38.

Alternatively, the exit port 38 may be located in a wall and over the base of the vat 26. In such an embodiment, the bulkhead 34 is not required to define a mixing chamber, and may thus be omitted.

After exiting through port 38, the alimentary paste passes over a sensor probe 40. The sensor electronically determines the presence or absence of dough (paste). Satisfactory results have been obtained by using a "Mek 54" High Sensitivity Electronic Relay, manufactured by MEKontrol Inc., of Northboro, Massachusetts. This relay opens or closes a circuit in response to a change in resistance in an initiating circuit. The probe may thus comprise simply two contacts positioned in the flow-path of the dough, which closes the initiating circuit. The relay responds to the consequent resistance change and communicates with a flour control mechanism 42 and a fluid control valve 44. When dough is detected by the sensor probe 40, the flour control mechanism 42 stops flour from moving along the flour conveyor 24 and from exiting from the chamber 20. This may be conveniently achieved by interrupting the power source of the vibrator, and by closing a valve at the base of the chamber 20. A fluid control valve 44 may be inserted in the primary fluid line 22 to stop the flow of fluid between the chamber 12 and the mixing vat 28 at times determined by the sensor probe 40.

Consequently, each of the ingredients required for the alimentary paste enters the mixing vat in predetermined proportions until the mixing compartment 35 of the mixing chamber 28 becomes sufficiently filled so that the paste flows over the top of the bulkhead 34 and exits from the mixing vat 26 through port 38. The sensor probe 40 detects the presence of paste and causes the flow of ingredients into the mixing vat 28 to stop until the flow of paste over the bulkhead 34 ceases. Thereupon, the ingredients are again permitted to flow into the mixing chamber. This results in a relatively stable level of alimentary paste within the mixing chamber and permits continuous operation of the food manufacturing process. Small variations in the rate of feed of the individual components will not have serious effects due to the homogenizing action of the paddles 32 in the mixing chamber 28 and the stable level of mixed ingredients in the mixing compartment 35 of the chamber 28.

The paste, after flowing over the sensor probe 40, falls downwardly upon a paste divider 50 which may take the form of two intersecting planar surfaces disposed in the flow path of the exiting alimentary paste. The divider 50 consequently separates the paste into two fractions, each of which passes between respective pairs of rollers 52 which compress the two fractions into two sheets 115 of paste or dough. The alimentary paste is then processed by conventional machinery known to the art.

In the embodiment described here, the ramen-making machinery is substantially similar to machinery made in Japan by the Otaki Company, Tokyo, Japan. As mentioned above, the machinery rolls the paste into a continuous sheet which is then cut into strands. The strands are then curled and cooked in a steamer, and the cooked strands are cut into lengths and folded. Next the cooked strands are conveyed through a dryer, and then cooled. The ramen is ready for packaging. Each of these steps is described in detail below.

Each of the alimentary paste sheets 115 which are formed by rollers 52 is is guided to a moving endless belt 56 and conveyed on the belt through one or more pairs of rollers 58 which eventually thin the two sheets into a single compressed sheet of dough 116.

The compressed sheet 116 passes through a pair of guide rollers 60 downwardly through another pair of rollers 62 which slice the compressed sheet 116 into a plurality of strands 117. This is conveniently achieved by passing the sheet 116 between two rollers 62 on which are formed a plurality of threads 64. The rollers 62 are disposed proximate one another so that their threads mesh.

A curl is introduced to the strands 117 by the action of two plates 66 disposed generally beneath the rollers 62. The plates 66 are hinged about axis 72. A counterweight, formed by shaft 68 threaded to receive a nut 70, is mounted to the upper plane of the plate 66, so that the counterweight urges inward rotation of the plates. The plates 66 are disposed so that a chute or funnel is formed in the flow path of the unrippled strands of dough 117. The counterweights exert a force on the plates 60 which prevent them from opening outwardly thereby causing the noodle strands to hunch up or ripple within the funnel or chute formed by the plates. As the strands begin to pile up in the chute or funnel, the weight of the strands increases and forces the plates apart thereby permitting continuous flow of the strands. After the strands are released, the counterweights cause the plates to rotate inwardly, reform the chute and cause the strands to ripple. The movement of the plates described above is slight, but sufficient to make ripples in the strands. Through continued operation in this manner, periodic ripples or curls are introduced into the strands to form rippled strands 118.

The rippled strands exit the cutting and curling device by an endless conveyor belt 74 passing beneath the plate 66 and intersecting the flow path of the rippled strands 118. The conveyor belt 74 delivers the rippled strands 188 to another conveyor belt 80 which guides the rippled strands 118 through a cooking device 82. The cooking device provides pressurized steam to cook the strands. Satisfactory results have been obtained with a cooking device made by the Sanko Co., Japan and known as Sanko #7 operated at a pressure of approximately 5 kilograms per square centimeter.

The conveyor belt 80 thereupon delivers the cooked and rippled strands 118 to a cutter 90 which may comprise simply two intersecting blades which cut the rippled strands 118 into predetermined lengths 119. After passing through the cutter 90, the lengths of rippled strands 119 are delivered to another conveyor 92. During their travel along the conveyor 92, each of the groups of strands 119 may be manually or automatically (not shown) folded into a more compact brick 120, which is then placed upon another conveyor 94. The conveyor 94 guides the bricks, which may each be housed in a tray along the conveyor 94, through a fryer 96. Satisfactory results may be obtained with a Sanko fryer which directly contacts the strands with hot oil at a temperature of approximately 285° F. or a fryer made by the Otaki Company or a continuous frying machine with a hold down conveyor. Thereafter, the dried bricks are delivered to another conveyor belt 98 which guides the dried bricks 120 through a cooling device which may comprise one or more fans 100 disposed to move an air current across the belt 98. After being conveyed past the fans 100, the bricks 120 are ready for packaging.

It will be appreciated that through the use of the continuous feed alimentary paste mixer, the apparatus and process for manufacturing paste products such as the one described, as well as others, is capable of continuous operation and therefore of enhanced utility.

To those skilled in the art it will be apparent that the present invention is capable of taking various useful forms, and it is preferred, therefore, that this disclosure be taken in an illustrative sense, and that the scope of protection afforded be determined by the appended claims.

What is claimed as the invention is:

1. A continuous-feed alimentary paste mixer for mixing and continuously delivering alimentary paste made from at least a fluid ingredient and a flour ingredient, said mixer comprising:
    a mixing vat defining a mixing chamber for receiving ingredients for making alimentary paste, said mixing chamber including an exit port for discharge of alimentary paste;
    rotatable mixing means disposed within said mixing chamber for blending alimentary paste ingredients placed within said mixing chamber;
    an alimentary paste sensor positioned proximate said exit port and in the flow path of discharging paste for sensing the presence or absence of alimentary paste;
    a fluid feeder communicating with said mixing chamber for holding and delivering fluid ingredients of alimentary paste;
    fluid control means cooperating with said fluid feeder and responsive to said paste sensor for interrupting the flow of fluid to said mixing chamber unless said paste sensor detects the presence or absence of alimentary paste;
    a flour feeder communicating with said mixing chamber for holding and delivering flour ingredients of alimentary paste;
    flour control means cooperating with said flour feeder and responsive to said paste sensor for interrupting the flow of flour ingredients to said mixing chamber unless said paste sensor determines the presence or absence of alimentary paste;
    means for delivering the fluid and flour to said mixing chamber at a constant predetermined rate;
    said fluid feeder comprising:
    a first fluid chamber having an exit port communicating with said mixing chamber, an entry port communicating with a second fluid chamber, and overflow removal means for removing fluids exceeding a predetermined level within said first fluid chamber;
    a second fluid chamber communicating with said first fluid chamber for holding an excess quantity of fluid ingredients to fill said first fluid chamber to said predetermined level; and
    fluid delivery means for delivering fluid from said second fluid chamber to said first fluid chamber at a rate sufficient to maintain said first fluid chamber substantially at said predetermined level.

2. A continuous-feed alimentary paste mixer for mixing and continuously delivering alimentary paste made from at least a fluid ingredient and a flour ingredient, said mixer comprising:
    a mixing vat defining a mixing chamber for receiving ingredients for making alimentary paste, said mixing chamber including an exit port for discharge of alimentary paste;
    rotatable mixing means disposed within said mixing chamber for blending alimentary paste ingredients placed within said mixing chamber;
    an alimentary paste sensor positioned proximate said exit port and in the flow path of discharging paste for sensing the presence or absence of alimentary paste;
    a fluid feeder communicating with said mixing chamber for holding and delivering fluid ingredients of alimentary paste;
    fluid control means cooperating with said fluid feeder and responsive to said paste sensor for interrupting the flow of fluid to said mixing chamber unless said paste sensor detects the presence or absence of alimentary paste;
    a flour feeder communicating with said mixing chamber for holding and delivering flour ingredients of alimentary paste;
    flour control means cooperating with said flour feeder and responsive to said paste sensor for interrupting the flow of flour ingredients to said mixing chamber unless said paste sensor determines the presence or absence of alimentary paste;
    means for delivering the fluid and flour to said mixing chamber at a constant predetermined rate;
    said flour feeder comprising:
    a first flour chamber having a flour exit port;
    a second flour chamber for storing a quantity of flour sufficient to fill said first flour chamber to a predetermined level;
    flour conveyor means communicating with said first flour chamber and said second flour chamber for delivering contents of said second flour chamber to said first flour chamber;
    flour conveyor means communicating with said flour exit port and said mixing chamber for delivering contents of said first flour chamber at a predetermined rate to said mixing chamber.

3. A continuous-feed alimentary paste mixer for mixing and continuously delivering alimentary paste made from at least a fluid ingredient and a flour ingredient, said mixer comprising:
    a mixing vat defining a mixing chamber for receiving ingredients for making alimentary paste, said mixing chamber including an exit port for discharge of alimentary paste;
    rotatable mixing means disposed within said mixing chamber for blending alimentary paste ingredients placed within said mixing chamber;

an alimentary paste sensor positioned proximate said exit port and in the flow path of discharging paste for sensing the presence or absence of alimentary paste;

a fluid feeder communicating with said mixing chamber for holding and delivering fluid ingredients of alimentary paste;

fluid control means cooperating with said fluid feeder and responsive to said paste sensor for interrupting the flow of fluid to said mixing chamber unless said paste sensor detects the presence or absence of alimentary paste;

a flour feeder communicating with said mixing chamber for holding and delivering flour ingredients of alimentary paste;

flour control means cooperating with said flour feeder and responsive to said paste sensor for interrupting the flow of flour ingredients to said mixing chamber unless said paste sensor determines the presence or absence of alimentary paste;

a bulkhead disposed within said mixing chamber and extending from the base of said mixing chamber vertically upward to partially divide said mixing chamber into an exit compartment and a mixing compartment of said mixing chamber, said exit port of said mixing chamber being disposed in the base of said mixing vat in said exit compartment, and said paste sensor being disposed beneath said exit compartment.

4. A continuous-feed alimentary paste mixer for mixing and continuously delivering alimentary paste made from at least a fluid ingredient and a flour ingredient, said mixer comprising:

a mixing vat defining a mixing chamber for receiving ingredients for making alimentary paste, said mixing chamber including an exit port for discharge of alimentary paste;

rotatable mixing means disposed within said mixing chamber for blending alimentary paste ingredients placed within said mixing chamber;

an alimentary paste sensor positioned proximate said exit port and in the flow path of discharging paste for sensing the absence of alimentary paste;

fluid control means cooperating with a fluid feeder and responsive to said paste sensor for interrupting the flow of fluids to said mixing chamber unless said paste sensor detects the presence or absence of alimentary paste;

flour control means cooperating with a flour feeder and responsive to said paste sensor for interrupting the flow of flour ingredients to said mixing chamber unless said paste sensor determines the presence or absence of alimentary paste;

a fluid feeder including
 (a) a first fluid chamber having an exit port communicating with said mixing chamber, an entry port communicating with a second fluid chamber, and overflow removal means for removing fluids exceeding a predetermined level within said first fluid chamber,
 (b) a second fluid chamber communicating with said first fluid chamber, for holding an excess quantity of fluid ingredients of alimentary paste, said excess quantity being sufficient to fill said first fluid chamber to said predetermined level, and
 (c) fluid delivery means for delivering fluid from said second fluid chamber to said first fluid chamber at a rate sufficient to maintain said first fluid chamber substantially at said predetermined level;

a flour feeder including
 (a) a first flour chamber having a flour exit port,
 (b) a second flour chamber for storing a quantity of flour sufficient to fill said first flour chamber to a predetermined level,
 (c) flour conveyor means communicating with said first flour chamber and said second flour chamber for delivering contents of said second flour chamber to said first flour chamber, and
 (d) flour conveyor means communicating with said flour exit port and said mixing chamber for delivering contents of said first flour chamber at a predetermined rate to said mixing chamber; and a bulkhead disposed within said mixing chamber and extending from the base of said mixing chamber vertically upward to partially divide said mixing chamber into an exit compartment and a mixing compartment of said mixing chamber, said exit port of said mixing chamber being disposed in the base of said exit compartment in said mixing vat, and said paste sensor being disposed beneath said exit compartment.

5. A machine for manufacturing an alimentary paste product, said product including at least partially cooked alimentary paste, said machine comprising:

a mixer including
 (a) a mixing vat defining a mixing chamber and having an exit port,
 (b) mixing means disposed within said mixing chamber for mixing any contents of said mixing chamber,
 (c) a paste sensor positioned proximate said exit port and in the flow path of exiting alimentary paste for detecting the presence or absence of flow of alimentary paste through said exit port,
 (d) fluid feeder means communicating with said mixing chamber, for holding and delivering fluid ingredients of alimentary paste to said mixing chamber at a predetermined rate,
 (e) flour feeder means, communicating with said mixing chamber, for holding and delivering flour ingredients of alimentary paste to said mixing chamber at a predetermined rate,
 (f) fluid control means cooperating with said fluid feeder means and responsive to said paste sensor for interrupting the flow of fluid to said mixing chamber unless said paste sensor determines the presence or absence of flow of alimentary paste through said exit port, and
 (g) flour control means cooperating with said flour feeder means and responsive to said paste sensor for interrupting the flow of flour from said flour feeder means to said mixing chamber unless said paste sensor determines the absence of flow alimentary paste through said exit port;

sheet forming means cooperating with said mixer for shaping said alimentary paste into a substantially continuous sheet of paste having a predetermined thickness;

cutting means for slicing said sheet into a plurality of substantially continuous strands;

cooking means for receiving curled strands of alimentary paste and at least partially cooking said strands;

a cutter for cutting curled strands of alimentary paste into substantially equal lengths of strands; and drying means cooperating with said cooking means for drying the cooked curled strands of alimentary paste;

6. A machine according to claim 5 wherein said mixer further comprises a bulkhead disposed within said mixing chamber and extending vertically upward from the base of said mixing chamber to partially divide said mixing chamber into an exit compartment and a mixing compartment, said exit port being disposed in the lower portion of said exit compartment.

7. The machine according to claim 6 wherein said mixing means comprises at least one rotatable shaft extending through said mixing chamber and passing through said exit compartment; further comprising a plurality of mixing paddles radially mounted to said shaft, each of said paddles including a flat surface, at least one paddle being disposed within said exit compartment, said paddle disposed within said exit compartment being adapted to sweep over said exit port within said exit compartment for sweeping excess alimentary paste from said exit port.

8. A machine according to claim 5 wherein said cutter comprises two rollers each including a plurality of radially extending threads, said rollers being disposed relative to one another for meshing of said threads, said rollers being disposed to receive said sheet of alimentary paste.

* * * * *